United States Patent [19]

Angersbach et al.

[11] 4,313,532

[45] Feb. 2, 1982

[54] DRIVING ARRANGEMENT WITH A FRICTION CLUTCH

[75] Inventors: Wolfgang Angersbach; Rudolf Kling, both of Darmstadt, Fed. Rep. of Germany

[73] Assignee: Quick-Rotan Elektromotoren GmbH, Darmstadt, Fed. Rep. of Germany

[21] Appl. No.: 62,899

[22] Filed: Aug. 1, 1979

[30] Foreign Application Priority Data

Aug. 11, 1978 [DE] Fed. Rep. of Germany ....... 2835300

[51] Int. Cl.³ ............................................. F16D 13/74
[52] U.S. Cl. .................................................. 192/113 B
[58] Field of Search .......... 192/113 B, 113 R, 107 M, 192/107 R, 107 C; 188/264 B

[56] References Cited

U.S. PATENT DOCUMENTS 535,738  3/1895  Smith .............................. 192/113 B
2,844,230  7/1958  Armstrong ...................... 192/113 B

FOREIGN PATENT DOCUMENTS 291382  4/1916  Fed. Rep. of Germany ... 192/113 B

Primary Examiner—George H. Krizmanich
Attorney, Agent, or Firm—Michael J. Striker

[57] ABSTRACT

A driving arrangement with a friction clutch has at least one clutch element arranged to transmit torque and forming a friction face, and at least one lubricating storing container carried by the clutch element and arranged for accommodating a lubricating medium and distributing the latter over the friction face. The clutch element may be provided with a friction member forming the friction face and constituted of cork. The lubricant storing container may be formed as a hollow ring whose hollow is connected with the friction face so as to provide a dosed passage or the lubricating medium to the latter.

13 Claims, 6 Drawing Figures

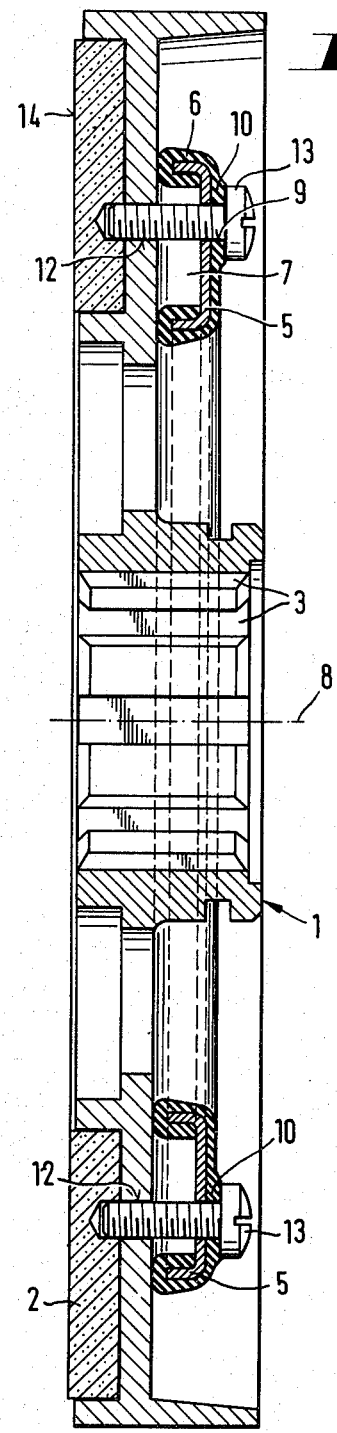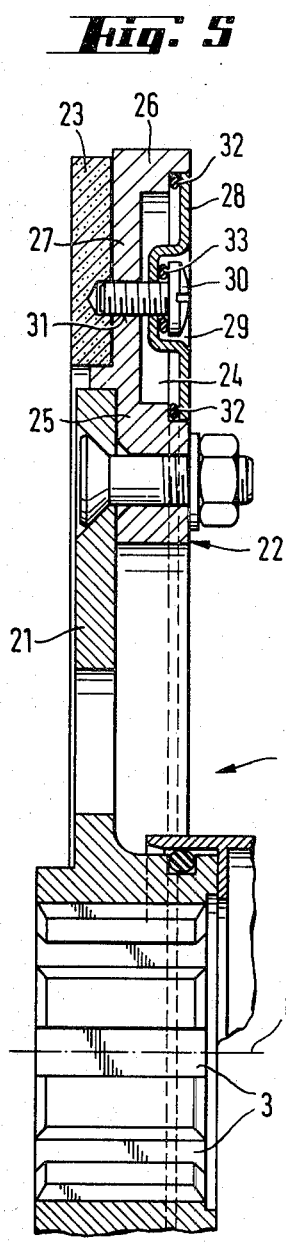

DRIVING ARRANGEMENT WITH A FRICTION CLUTCH

BACKGROUND OF THE INVENTION

The present invention relates to a driving arrangement with a friction clutch for transmission of starting moment and/or braking moment to a shaft to be driven or braked.

Clutch motor drives are known having two clutch disc halves which are in driving connection with a driven shaft and can be coupled by axial displacement alternatively with a driven plate mounted on a continuously rotating motor shaft, or with a braking block. The axial displacement of the clutch disc halves is performed by electromagnets. The driven shaft is rotatably supported in a bearing bracket in which the braking block is also accommodated (as disclosed in the German Pat. No. 1,613,346, the U.S. Pat. No. 3,487,438).

The clutch disc halves may be composed of carrying discs, and friction coatings of elastic material such as cork, mounted on the carrying discs. The friction faces must be such as to withstand, for example in the driving arrangement of the drive of industrial sewing machines, 20000 switching cycles and more per working day. It appears that the friction coating of pressed and grease-treated or oil-treated cork is best suited for such extreme conditions. However, friction faces dry up relatively fast as a result of generated heat and flowing away of the lubricating medium under the action of centrifugal force. This results in squeaking noise.

SUMMARY OF THE INVENTION

Accordingly, it is an object of the present invention to provide a driving arrangement which avoids the disadvantages of the prior art.

More particularly, it is an object or the present invention to provide a driving arrangement with a friction clutch whose friction faces have increased service life, and in which an indesirable generation of noise is inhibited.

In keeping with these objects and with others which will become apparent hereinafter, one feature of the present invention resides, briefly stated, in a driving arrangement with a friction clutch in which a movable or immovable torque transmitting clutch part carries at least one lubricant storing means for accommodating a lubricating medium and distributing the same over a friction face of the clutch part.

It has been shown that continuous slight lubrication of the friction face during the operation considerably increases the service life or the friction clutch, in many cases even several times. This is because the lubricating material which tends to be lost as a result of generation of heat or action of centrifugal force is continuously replenished. Because of the provision of the not tearable off slight oil film, the friction noise, such as squeaking and cracking noise, is avoided. It has further been shown that the lubricating medium, such as oil, which freely moves in the lubrication storing means damps vibrations attributed to fast loading changes of the driving machine.

The fact that in accordance with the invention the lubricating medium is ready to be applied onto the friction faces reliably and for a long time is especially important for friction coatings, for example formed as rings constituted of cork. Its action is further improved when the friction faces are constituted or other materials, such as metal, synthetic plastic material or compact material of metal and synthetic plastic.

A container suitable for accommodating the lubricating medium may be utilized as the lubricant storing means. An especially simple construction is obtained when the lubricant storing means is formed as a hollow ring which is concentric with an axis of rotation of the clutch part, the hollow ring having an inner hollow which is connected with the friction face so that a closed passage of the lubricating medium to the friction face is provided. The hollow ring may be located concentrically inside and/or outside the friction face. Advantageously, the hollow ring is arranged on the clutch part which transmits torque and at its side facing away from the friction face, at a radial location corresponding to the radial location of the friction face.

The transfer of the lubricating medium from the lubricant storing means to the friction face may be performed through fine holes, through pores of a porous intermediate wall, or the like connecting passages. An especially attractive constructive solution is attained when the lubricating means is connected with the clutch part by mounting screws which extend through the device accommodating the lubricating medium and engage in the friction coating advantageously constituted of cork. It has been found that the thread of the mounting screws convey the lubricating medium in required quantity to the friction face, without taking additional measures.

The lubricant storing means and/or the mounting screws may be sealed by sealing rings, especially rubber rings, in order to prevent flowing out of the lubricating medium. The lubricant storing means may be formed by a drawn sheet and provided with a sealing coating, for example of rubber. The sealing coating may be vulcanized on the sheet. A supply of an acidless organic oil is accommodated in the lubricant storing means. Means may be provided, such as a replenishing opening which is generally closable by a return valve, for replenishing the lubricating medium when needed.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 is a view showing a section of a clutch disc with a friction coating and a lubricant storing device;

FIG. 5 is a view showing a partial section of the clutch disc and lubricant storing device, in accordance with another embodiment of the present invention.

DESCRIPTION OF THE PREFERRED EMBODIMENTS

An arrangement in accordance with one embodiment shown in FIG. 1 has a clutch disc 1 which carries a friction coating 2 at its one side and in the radially outer region. The friction coating 2 is constituted of cork. When the clutch disc 1 is a part of an electro-magnetic friction clutch, it is constituted of a ferromagnetic material.

The clutch disc 1 has teeth 3 by which it is connected with a not shown driven shaft for joint rotation with and axially movably relative to the same. It may be fixed to a driven plate on the motor shaft of an electric driving motor or cooperate with an advantageously stationary brake block, as disclosed for example in the German Pat. No. 1,613,346, the U.S. Pat. No. 3,487,438, and therefore does not require additional explanations.

Figure 3:
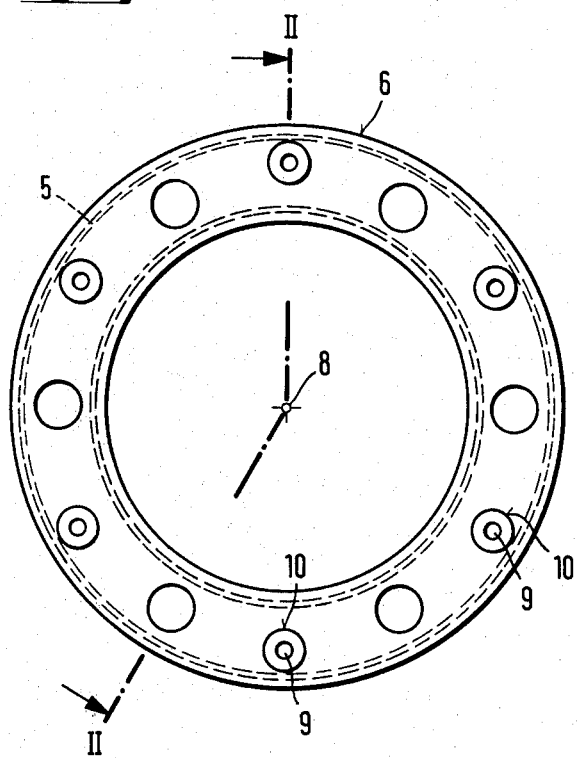
FIG. 3 is a plan view taken at the right side of FIG. 2.
Figure 2:
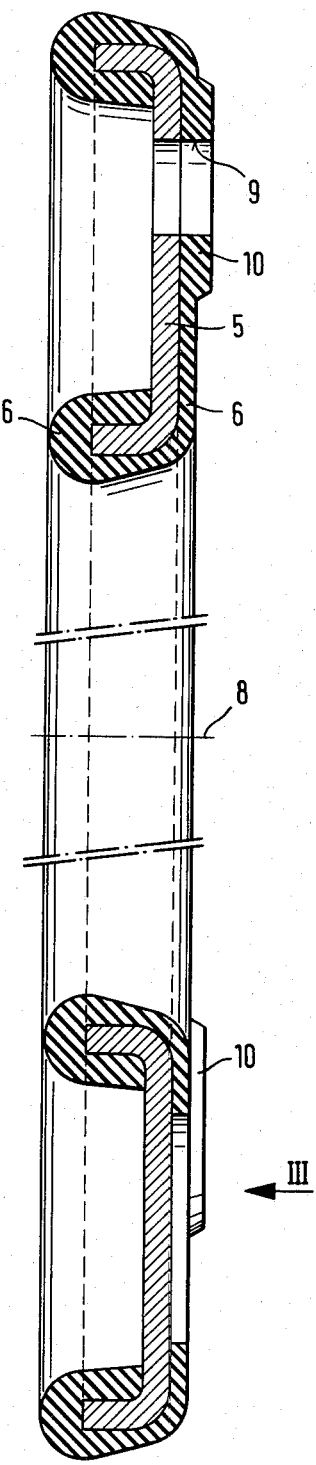
FIG. 2 is a view showing a partial section of an enlarged fragment of the lubricant storing device of FIG. 1 formed as hollow ring, taken lengthwise of line II—II of FIG. 3.

The coupling disc 1 carries a hollow ring 5 which is formed from a drawn sheet and is arranged at a side opposite to the friction coating. A sealing coating 6 is vulcanized on the hollow ring 5. The hollow ring 5 together with the clutch disc 1 limit a hollow provided for admitting a lubricating medium, for example an acid less organic oil. The hollow 7 has a radial location corresponding to that of the friction coating 2. Both the friction coating 2 and the hollow ring 5 are concentric with an axis of rotation 8 of the clutch disc 1. Six openings 9 extend through the hollow ring 5 having U-shaped cross section and through the sealing coating 6. The openings 9 are uniformly distributed in circumferential direction. The sealing coating 6 has bosses 10 arranged around the openings 9 (FIG. 2). Threaded holes 12 of the clutch disc 1 are in axial alignment with the openings 9. Screws 13 are screwed in the threaded openings 12 and extend through the openings 9 and the hollow 7. The heads of the screws lie with sealing action on the bosses 10 of the sealing coating 6. The opposite end portions of the screws pierce an axial part of the friction coating 2 at a side which is opposite to the friction faces 14.

During the operation, oil is urged to flow through a free space between the inner thread of the threaded holes 12 and the outer thread of the screws 13 from the hollow 7 to the friction coating 2. Thereby lubricating medium which escapes out of the oil-impregnated cork friction coating is continuously replenished. A thin oil film which is not torn is held on the friction face 14. Thus the service life of the friction coating 2 is remarkably increased, friction noise is eliminated, and oil freely accommodated in the hollow 7 acts in noise-damping manner.

An arrangement in accordance with the embodiment shown in FIG. 5 has a clutch disc 20 with a hub 21 of a ferromagnetic material. A ring 22 of a light metal, particularly aluminum is screwed (not shown) or riveted to the hub 21. Since the radially outer part of the clutch disc is constituted of light metal, the moment of inertia of the clutch disc 20 is decreased. The ring 22 carries at its one side a friction coating 23 which is advantageously constituted of cork. A hollow 21 for admitting of lubricating medium is provided, at the opposite side. This hollow is bounded by a concentric flange 25, 26, a connecting web 27 of the ring 22, and a substantially flat sheet disc 28. The sheet disc 28 is provided with depressions 29 which are distributed in circumferential direction. The depressions 29 receive the heads of the screws 30. The latter extend through the sheet disc 28, the hollow 24, and threaded holes 31 or the ring 22, and engage in an upper region of the friction coating 23 which faces toward the ring 22. Sealing rings 32 and 33 are arranged for sealing between the sheet disc 28 and the ring 22 or the screws 30. The operation or the arrangement shown on FIG. 5 substantially corresponds to the operation of the arrangement shown in FIG. 1.

Figure 6:
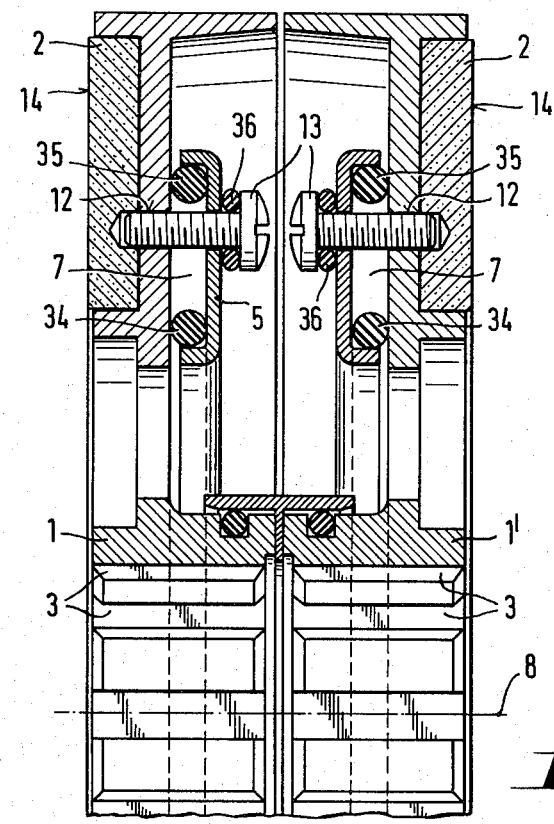
FIG. 6 is a view showing two coaxial clutch discs with lubricant storing devices associated therewith.
Figure 4:
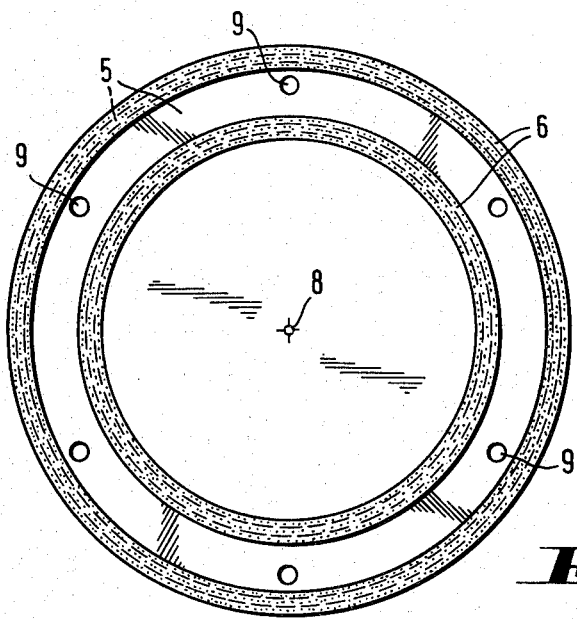
FIG. 4 is a plan view taken at the left side or FIG. 2.

FIG. 6 shows two clutch discs 1 and 1' which are located laterally adjacent to one another and each corresponds to the clutch disc of FIGS. 1-4. The clutch disc 1 can cooperate with the driven plate of the motor, whereas the clutch disc 1' may be associated with a stationary braking block, as disclosed for example in the German Pat. No. 1,613,346.

The hollows 7 for admitting of lubricating medium are bounded by the hollow rings 5. In contrast to the construction shown in FIGS. 1-4 the hollow rings 5 do not carry vulcanized coatings. In order to seal the hollows 7, concentric sealing rings 24 and 25 are arranged between the clutch discs 1 and 1' and the hollow rings 5, and sealing rings 36 are arranged between the hollow rings 5 and the heads of the screws 13.

It will be understood that each of the elements described above, or two or more together, may also find a useful application in other types of constructions differing from the types described above.

While the invention has been illustrated and described as embodied in a driving arrangement, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. A driving arrangement with a friction clutch for transmitting of a starting moment and/or a braking moment to a shaft to be driven or braked, comprising at least one clutch element arranged to transmit torque and formed as a disc having an axis; a ring-shaped friction member arranged on said clutch element coaxial to the latter and forming a friction face; at least one lubricant storing means carried by said clutch element and arranged for accommodating a lubricating medium and distributing the latter over said friction face of said friction member; and means for mounting said lubricant storing means on said clutch element and including a plurality of threaded members which extend through said lubricant storing means and thereby through the lubricating medium accommodated therein, and engage in said friction member, so that the lubricating medium flows from said lubricant storing means to said friction face along the thread of said threaded members, whereby said threaded members form means for simultaneously mounting said lubricant storing means and guiding the lubricating medium.

2. A driving arrangement as defined in claim 1, wherein said clutch element is movable.

3. A driving arrangement as defined in claim 1, wherein said clutch element is immovable.

4. A driving arrangement in claim 1, wherein said clutch element has an axis and said friction face extends over a predetermined radial distance, said lubricating storing means extending over a radial distance corresponding to at least a portion of the radial distance over which said friction face extends.

5. A driving arrangement in claim 1, wherein said lubricant storing means forms one part and said friction member forms another part; and further comprising a sealing ring arranged for sealing at least one of said parts.

6. A driving arrangement in claim 5; and further comprising a further sealing ring arranged for sealing the other of said parts.

7. A driving arrangement in claim 1, wherein said lubricant storing means is formed by a sheet provided with a sealing coating.

8. A driving arrangement in claim 7, wherein said sealing coating is vulcanized on said sheet.

9. A driving arrangement in claim 1, wherein said lubricant storing means accommodates a supply of acidless organic oil.

10. A driving arrangement as defined in claim 1, wherein said clutch element is a one piece member through which said threaded members extend.

11. A driving arrangement as defined in claim 1, wherein said clutch element has a radially inner portion and a radially outer portion detachably connected with said radially inner portion, said friction member being arranged on and said threaded members extending through said radially outer portion of said clutch element.

12. A driving arrangement as defined in claim 1, wherein said friction member is made of cork.

13. A driving arrangement as defined in claim 1, wherein said lubricant storing means includes a member which is detachably connectable with said clutch element and in connected condition forms together with the latter an inner lubricant containing hollow which communicates with said friction face through the thread of said threaded members and is completely closed with the exception of said communication.

* * * * *